2 Sheets—Sheet 1.
S. M. PERRY.
Car Seat and Couch.
No. 678. Reissued Mar. 29, 1859.
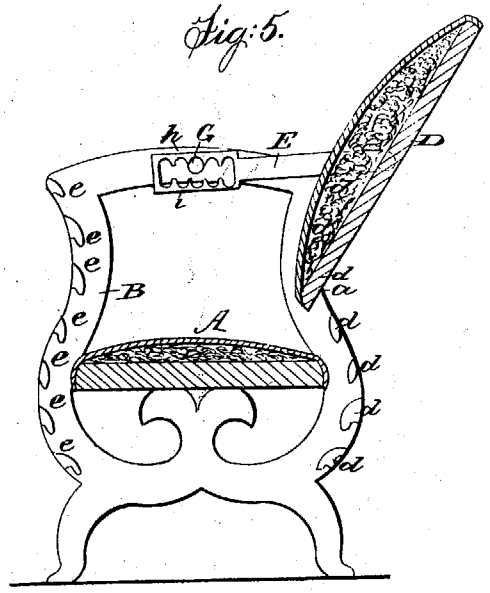
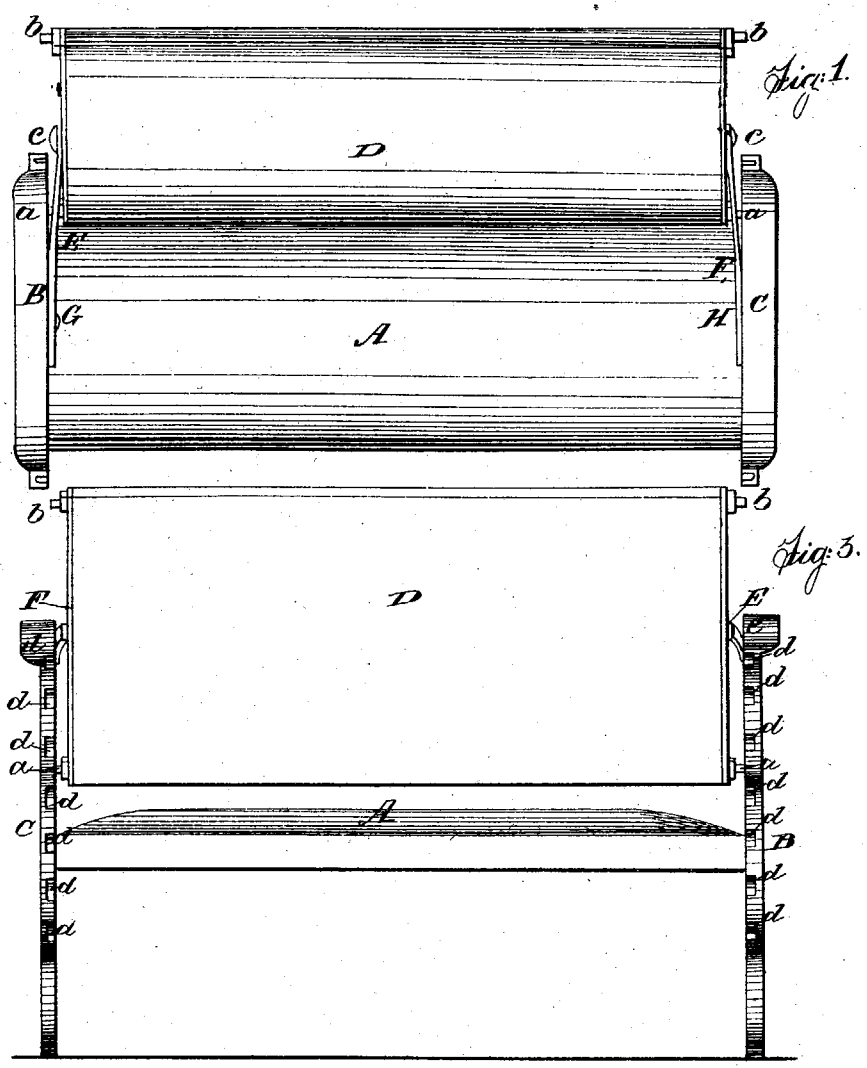

2 Sheets—Sheet 2.
S. M. PERRY.
Car Seat and Couch.
No. 678.
Reissued Mar. 29, 1859.
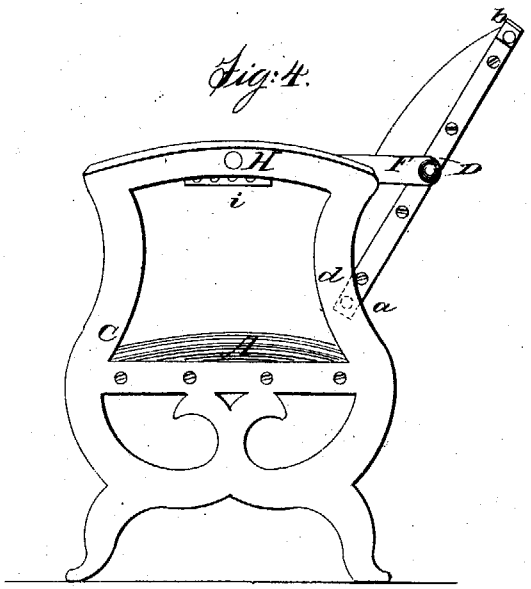
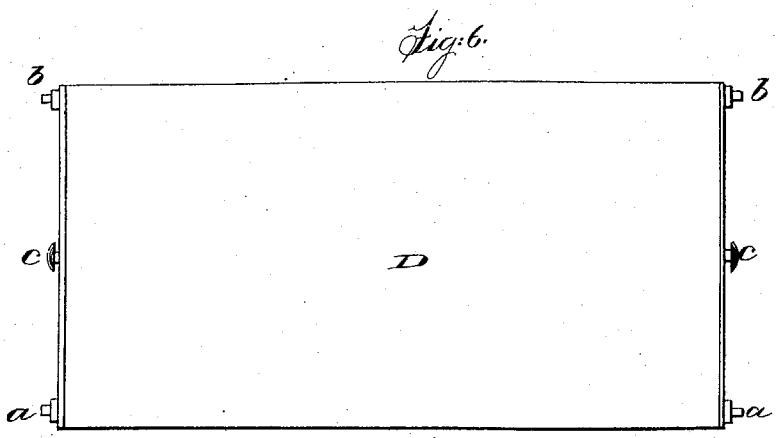
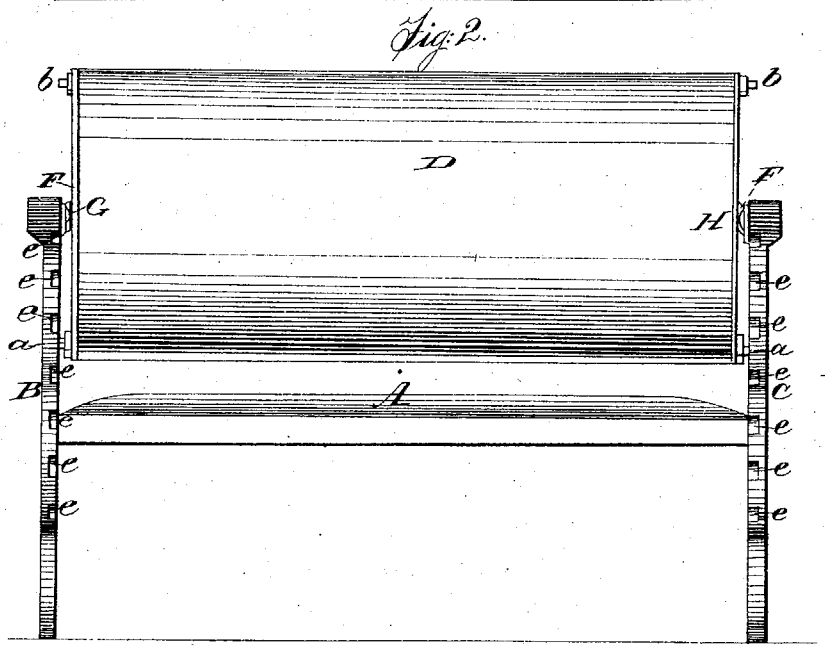

UNITED STATES PATENT OFFICE.

ISAAC L. DEVOE, OF STATEN ISLAND, ASSIGNEE, THROUGH MESNE ASSIGNMENTS, OF SAMUEL M. PERRY, OF PORT RICHMOND, NEW YORK.

IMPROVEMENT IN RECLINING CHAIRS FOR RAILROAD-CARS AND OTHER USES.

Specification forming part of Letters Patent No. 9,155, dated July 27, 1852; Reissue No. 678, dated March 29, 1859.

*To all whom it may concern:*

Be it known that SAMUEL M. PERRY, of the city, county, and State of New York, did invent a new and Improved Reclining-Chair for Car-Seats, where a reclining or recumbent position is desired; and I do hereby declare the following to be a full, clear, and exact description thereof, reference being had to the accompanying drawings, figures, and letters of reference, making part of this specification.

Of the said drawings, Figure 1 denotes a top view of a car-seat. Fig. 2 is a front elevation of the same. Fig. 3 is a rear elevation. Fig. 4 is an end elevation. Fig. 5 is a vertical and central section of my improved chair or seat, and Fig. 6 is a view of its back as separated from the ends and bottom or seat of the chair.

Similar letters of reference indicate like parts in all the drawings.

The nature and object of my invention is to enable a person to raise the back of a chair and depress it, so that a person may sit upright or in a recumbent position, as desired, which is not the case in ordinary chairs, and to which my invention is specially applicable.

This improvement renders the chair especially useful in railway-cars which are run during the night, or hours usually devoted to sleep, to invalids, dentists, and other uses, as a person occupying the chair can so depress its back as to enable the occupant to support the head and back, and thus obtain a comfortable position for sleeping or resting.

To enable others skilled in the art to make and use my invention, I will proceed to describe its construction and operation.

In the drawings, A denotes the seat of the chair, made plain, stuffed, or upholstered in any proper way, and supported by end frames, B C, in the ordinary manner. The movable back is seen at D, and is held in place by bars E F, that extend, respectively, from the middle parts of its two ends, and are connected to the inner sides of the arms or upper bars of the frame B C by means of a series of teeth or equivalent devices, G H, on which the said bars turn, whereby the back for car-seats can be turned over so as to stand in an opposite direction on the seat, as is well known. From each end of the back, and at or near the lower corner of it, I extend a stud or projection, *a*, and in case the back is to be reversible I also extend another projection or stud, *b*, from the upper corner of each end, as seen in Fig. 6. The back D is so connected to the two bars E F as to enable them to turn vertically on the connecting-pins *c c*, that pass through the said bars and are fixed in the ends of the back. In the back edges of the two frames B C, I make a series of vertical or inclined notches, *d d*, which I place at different heights, as seen in the drawings, and so as to receive the studs *a a*, the notches of one end frame being made to correspond in number and height with those of the other frame. In case the back is a reversible one, I make a second series of such notches on the opposite side of the two end pieces, as seen at *e e*, &c. These notches should each be made so as to hold the back in place, or so that when the back is pressed against by the back of a person while sitting upon the seat the external sides of the notch shall prevent the lower edge of the seat from being moved backward by such pressure. This series of notches applied to the two end frames on the same side of the seat enables a person not only to raise or lower the back to different altitudes, but to give it such an inclination as may be agreeable for supporting the head of a person as well as the back.

In order to aid the back in being further inclined, each of the bars or arms E F may be provided with a rack of teeth, *h*, or ratchet and stop, which may be made to catch between any two of the teeth on the pins G or H below it, whereby the back, when brought up to any required altitude, may be set forward or backward, and locked by the rack and pin at such inclination as may be desired.

When the reversible back is used, I make use of racks *h i* for each bar E or F, they being made to stand opposite to each other, as seen in the drawings. When the back is reversed, the racks *i i* are used on the pins G H.

Thus far in this specification my invention is illustrated by drawings and described as applied to car-seats, and as the fatigue and discomfort of one or two positions during a night's ride in cars having ordinary seats is great, and from the relief afforded by simply changing positions, I have endeavored to give as many positions as possible to suit all sizes and forms of the occupants by means of the vertical and lateral adjustment of the back.

Having thus described this improved reclining chair, what I claim as the invention of SAMUEL M. PERRY, is—

1. To so combine the back D with the two end frames B C, by means of bars E F, jointed to it, one or two studs, *a*, and one or two series of notches, *d d*, or equivalents therefor, that the said back, when not a reversible one, may be raised and inclined in various positions, so as to not only support the back but the head of a person at the same time.

2. Making the back reversible by means of two series of notches, *d d* and *e e*, &c., and two sets of studs, *b*, or equivalents, the same being arranged on opposite sides of the chair and made to operate as specified.

3. The improvement of making each arm or bar E F with a rack or racks of teeth or succession of notches, or equivalents therefor, for the purpose of adjusting and securing the back in the desired position, whereby the occupant can alter or vary said position without rising from the seat, substantially as set forth.

ISAAC L. DEVOE,

*Assignee.*

Witnesses:

C. A. DURGIN,

A. J. DELAHAYE.